United States Patent [19]

Kaminski et al.

[11] 4,277,427
[45] Jul. 7, 1981

[54] RANDOMLY EMBOSSED SURFACE COVERING

[75] Inventors: Stanley J. Kaminski, Trenton; Robert D. Mansolillo, Bloomfield; Eugene A. Wilmer, Pennington, all of N.J.

[73] Assignee: Congoleum Corporation, Kearny, N.J.

[21] Appl. No.: 79,296

[22] Filed: Sep. 27, 1979

[51] Int. Cl.$^3$ ............................................. B29D 27/00
[52] U.S. Cl. ................................. 264/45.5; 264/45.1; 264/45.8; 264/52; 264/54; 264/DIG. 5; 427/373; 264/DIG. 82
[58] Field of Search .................. 264/45.1, 45.5, 45.8, 264/52, 54, DIG. 82, DIG. 5; 427/373

[56] References Cited

U.S. PATENT DOCUMENTS

| | | | |
|---|---|---|---|
| 2,918,702 | 12/1959 | Wetterau | 264/45.8 |
| 3,293,094 | 12/1966 | Nairn | 156/79 |
| 3,394,210 | 7/1968 | Franze | 264/45.5 |
| 3,464,934 | 9/1969 | Birkett et al. | 264/45.8 |
| 3,574,659 | 4/1971 | Kwart et al. | 427/373 |
| 3,674,611 | 7/1972 | Petry et al. | 264/DIG. 82 |
| 3,772,138 | 11/1973 | Witman | 264/52 |
| 3,804,657 | 4/1974 | Eyman et al. | 264/52 |
| 3,819,438 | 6/1974 | Witman | 264/52 |
| 3,819,783 | 6/1974 | Jones | 264/52 |

Primary Examiner—Donald E. Czaja
Assistant Examiner—W. Thompson
Attorney, Agent, or Firm—Shlesinger, Arkwright, Garvey & Dinsmore

[57] ABSTRACT

The process for producing a surface covering having a randomly embossed wear surface which comprises incorporating a blowing agent into a resinous composition, forming the resinous composition into a layer, heating to partially fuse the layer, printing a design on the surface of the layer, randomly distributing flakes of resinous composition containing an inhibitor for the blowing agent onto the printed surface of the layer, applying a clear wear layer thereto and heating the assembly to the decomposition temperature of the blowing agent.

16 Claims, 2 Drawing Figures

RANDOMLY EMBOSSED SURFACE COVERING

BACKGROUND OF THE INVENTION

Sheets of resinous composition have found widespread use as decorative and wear-resistant coverings for a wide range of products. Such sheets, for example, are used extensively as wall, floor and table coverings, book covers, decorative containers, as fabrics for use as upholstery, clothing and automobile interiors, and the like. In many instances, the resinous composition sheets are applied or formed on backings such as woven fabrics, paper, felt, metal, wood, glass, and the like. These backing materials have many purposes, the most common being added strength and serviceability. It is common practice to emboss the surface of such sheets to give added-decorative appeal and, in many instances, further utility. Typical of the types of embossings are those which simulate leather or textured cloth, such as linen. In some instances, the embossed areas are filled in with pigmented ink by techniques known as "spanishing" or "valley printing."

The introduction of cellular resinous compositions has led to their incorporation in products such as recited above, either alone, or in combination with non-cellular resinous composition surface wear layers and/or backing webs. The cellular foam sheet gives the product various desirable properties, depending on the type of cellular foam, such as high resiliency and good feel or "hand."

Embossing of resinous composition sheets is conventionally accomplished with an embossing roll or plate which has been engraved or otherwise treated to create the design desired in raised relief on its surface. The sheet and/or embossing surface is heated and the design pressed into the heat-softened sheet.

Various methods have been suggested for producing cellular foam products having a textured or embossed surface without utilizing embossing rolls. Embossing rolls are expensive to produce and when combined with a valley printing operation are difficult to control. In some instances, it is desired to print a design and then emboss in register with the design. Such an operation requires very complex equipment. Additionally, embossing of curved or irregular surfaces is very difficult.

One method which eliminates embossing rolls is disclosed in U.S. Pat. No. 2,961,332 which issued to R. Frank Nairn on Nov. 22, 1960. In accordance with this patent, a layer of foamable resinous composition is formed on a base by printing a number of different resinous compositions each containing its own amount or type of blowing agent. The layer is then heated to decompose the blowing agent and fuse the composition. The product has an irregular or textured surface conforming to the amount or type of blowing agent in the various printed compositions. Another method is disclosed in U.S. Pat. No. 2,964,799 which issued to P. E. Roggi et al., on Dec. 20, 1960. According to this patent, a foamable resinous composition is formed into a self-supporting sheet of fused composition. Heat is then applied to the foamable composition sheet at various points to cause the blowing agent at those points to decompose and form a cellular structure. The raised areas in the finished sheet correspond to the points of heat application. U.S. Pat. No. 2,825,282 which issued to J. B. Gergen et al., on Mar. 4, 1958, discloses a related method for producing a letterpress makeready. In accordance with this latter patent, a foamable composition is formed into a sheet and then printed with inks containing radiant energy-absorbing pigments. On exposure of the sheet to radiant energy, the blowing agent in contact with the pigments receives more intense heat and, therefore, will decompose and form cellular foam without affecting the unprinted portions of the sheet. As is apparent, the heating must be very rapid and carefully controlled.

An embossing technique which has become known as chemical embossing and which has proven to be a vast improvement over the procedures of the prior art is disclosed in U.S. Pat. Nos. 3,293,094 and 3,093,108, which issued to R. Frank Nairn et al on Dec. 20, 1966. In this procedure, the decomposition temperature of a chemical blowing agent dispersed in a resinous polymer composition is controlled by applying an inhibitor to the surface of the composition. The subsequent application of heat selectively decomposes the blowing agent, thereby resulting in the formation of either depressed or raised areas in the final product at the points of inhibitor application. The vehicle for applying the inhibitor to the surface of the resinous composition is a liquid printing composition. The inhibitor is mixed with the printing composition so that after the product is heated the embossed areas are in register with the printed design.

SUMMARY OF THE INVENTION

The primary object of this invention is to provide an embossed surface covering of novel construction. Another object is to provide such a surface covering having a random embossing. A further object is to provide such a surface covering with the random embossing in complete register with a random design. Various other objects and advantages of this invention will be apparent from the following detailed description thereof.

In accordance with the invention, a percentage of inhibitor is mixed with a suitable resin, and the mixture is calendered to form a sheet. The sheet may be transparent or it may be pigmented to a certain color. The calendered sheet is then granulated to form flakes of a desired size, and the flakes are randomly spread over a preprinted, partially fused (gelled) resinous sheet that contains a blowing agent. The gelled sheet is then heated to decompose the blowing agent and fuse the sheet. During the heating, the flakes act as an inhibitor to prevent the foamable gel from blowing in the areas where the flakes are present. The resulting product is a resinous sheet with random embossing. By varying the size of the flakes, and the amount of flakes spread over the foamable gel, both the size and the frequency of the depressions in the final product can be controlled. Furthermore, if the flakes have pigmentation contrasting that of the gel surface, the final product will have embossings in complete register with the random design created by the flakes. This process can be utilized in conjunction with the method of incorporating an inhibitor in the printing composition to produce a product that has geometric and random embossings.

The invention will be better understood from the following detailed description thereof together with the accompanying selfexplanatory drawings in which:

FIG. 1 is a flow diagram of a typical embodiment of the process utilized in this invention; and FIG. 2 is an enlarged cross-sectional view of a typical product.

DESCRIPTION OF THE PREFERRED EMBODIMENTS

Figure 1:
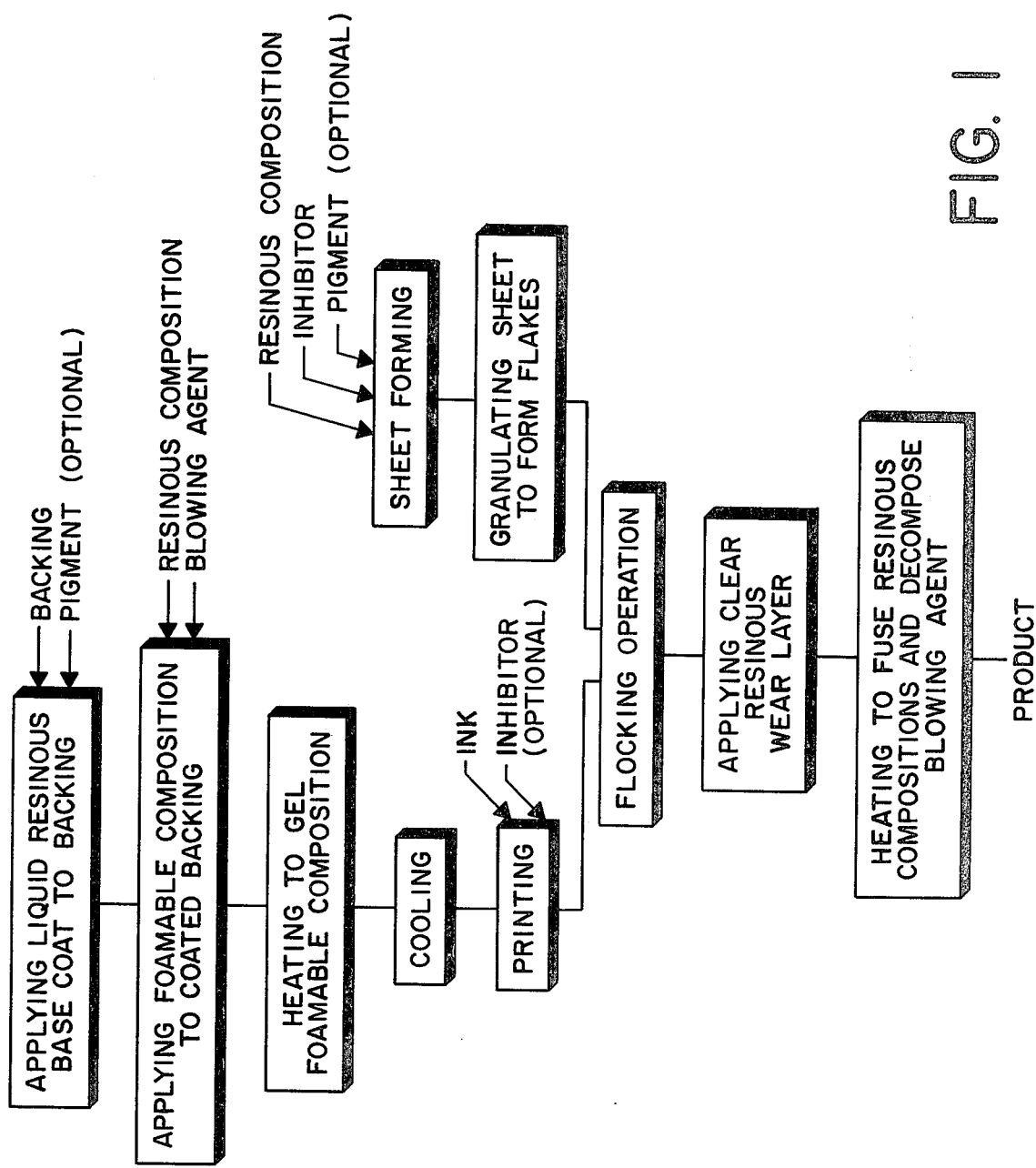
Figure 2:
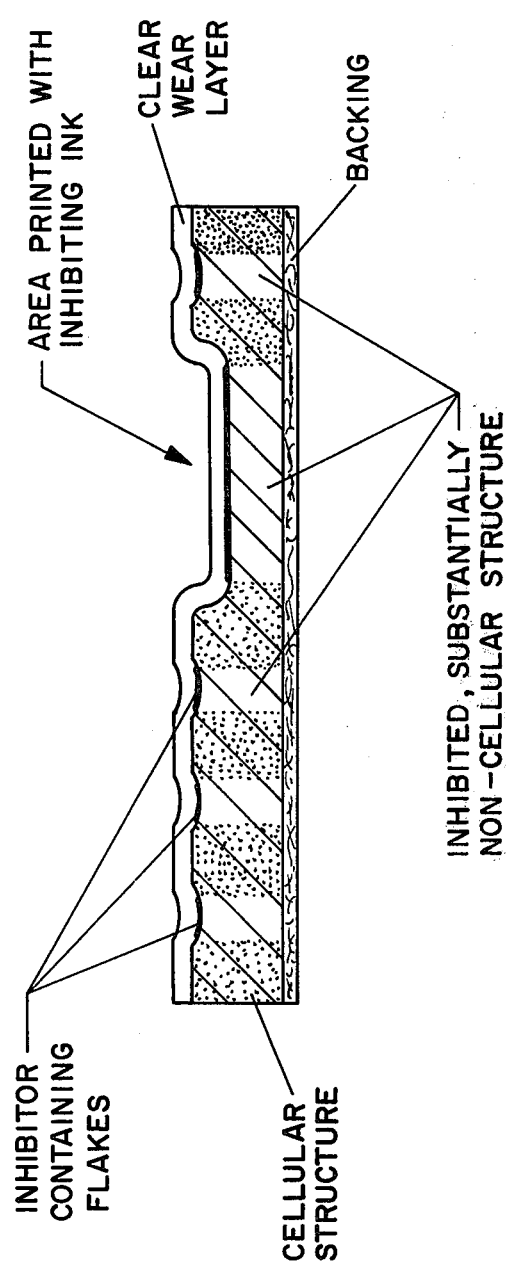

The backing web utilized will depend in large measure on the product to be produced. If the backing web is to remain as part of the finished product, then it can be formed of a resinous composition, felted sheet, woven or knitted fabric or the like. Any of the thermoplastic or elastomeric resinous compositions which can be formed into a sheet can be used to form backing sheets for use in the invention. Typical of the resins which can be compounded with plasticizers and fillers and sheeted to form a sheet are such resins as butadienestyrene copolymers, polymerized chloroprene, polyvinyl chloride, polyvinyl acetate, vinyl chloridevinyl acetate copolymers and the like. In some cases, scrap and degraded resinous compositions can be salvaged by forming them into sheets which can be used as backing sheets in producing products in accordance with the invention.

As indicated, suitable backing sheets also include woven fabrics formed of such fibers as cotton, wool, asbestos and various synthetic fibers. Where loosely woven fabrics such as burlap are used, the fabric can also be sized to prevent passage of the coating composition through the openings between the fibers by utilizing the conventional sizing composition used in the textile industry or a very viscous application of the coating composition which is to be applied. The coating can be dried or hardened quickly before it passes through the fabric.

It is sometimes desirable and particularly when the base is a felt sheet to apply a size coat prior to the application of the first coating. The size coat serves as a barrier coat to prevent migration of the felt impregnant into the coat. In addition, the size coat serves to provide good adhesion between the base sheet and the first coat. The size coat is preferably applied as an aqueous emulsion of a suitable resin although it can be applied as a plastisol or the like. Acrylic resins and vinyl chloride polymers have been found particularly useful for this purpose.

If the backing is to be removed from the final product, it is preferably a release paper. Such a paper conventionally has a coating on its surface to allow the plastic sheet to be easily stripped from the paper. Typical coatings used are clays, silicone compositions, polyvinyl alcohol, and similar special compositions well-known in the art.

In accordance with the invention, a foamable resinous polymer composition is applied to the base. The resinous binder is preferably one that is coalesced or fused into a continuous film by the application of heat since this allows gelling of the composition to produce a good printing surface. In this specification and claims, the term "fused" is intended to mean that state which is achieved in a resinous composition during the transition from a random dispersion or suspension of discrete resin particles in plasticizer to one of a homogenous consistency and uniform viscosity and rheological characteristics.

The foamable composition is also preferably a dispersion of resin in a liquid medium. The dispersion medium can be water in the case of an aqueous latex, organic solvent as an organosol or plasticizer as a plastisol. Best results have been obtained with a dispersion of resin in a plasticizer which is conventionally termed a plastisol. A plastisol has appreciable fluidity at normal room temperature, but is converted by heat into a fused, flexible, tough thermoplastic mass. Plastisols are preferred since it is unnecessary to remove large volumes of carrier as is necessary with a latex or organosol. The composition can also be a mixture of dry blend and blowing agent. The dry blend is resin particles having plasticizer absorbed on their surface. The dry blend with the addition of stabilizer, pigments and the like can be mixed with the blowing agent and distributed on a base in a smooth layer. The layer is then heated to either form a porous sheet or to fuse partially or completely the composition into a solid sheet.

The preferred and most widely used resin for surface coverings are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residue of other ethylenically unsaturated compounds polymerized therewith. The essential properties of the polymeric structure of polyvinyl chloride will be retained if not more than about 40 percent of the extraneous comonomer is copolymerized therein. Suitable extraneous comonomers include, for instance, vinyl bromide, vinyl fluoride, vinyl esters such as vinyl acetate, vinyl chloroacetate vinyl butyrate, other fatty acid vinyl esters, vinyl alkyl sulfonates, and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like. Although such vinyl chloride resins are preferred, as is apparent, the compositions can be formed from any resin which can be foamed with a blowing agent and the invention is not intended to be limited to any particular resin or group since many other types and groups of resins will occur to those skilled in the art and the particular resin selected does not form part of the invention. Other resins which can be mentioned, however, are polyethylene; polypropylene; methacrylates; synthetic rubber, such as neoprene, silicone, SBR and nitrile; polyurethanes; polyamides; polystyrene; phenolics, urea-formaldehydes; cellulose esters; epoxies and silicones.

Resins adaptable for use in formulating vinyl plastisols are commonly referred to as dispersion grade resins. Such resins are available having particle sizes of from about 0.02 to about 2 microns in contrast to calender grade vinyl resins which are available in particle sizes ranging up to 200 microns. Dispersion grade resins are usually of higher molecular weight than calender grade resins and have particle surfaces of a hard, horny nature. Polymers of vinyl chloride having specific viscosities of about 0.25 and preferably between 0.30 and 0.70 as measured in a solution of 0.4 gram of resin in 100 milliliters of nitrobenzene at 30° C. are particularly effective. (ASTM D1243-60.) Specific viscosity is a comparison of the blow time for a control of pure nitrobenzene solvent as compared to the solution of nitrobenzene and resin. The specific viscosity is determined as the sample flow time divided by the control flow time, minus 1. The specific viscosity is an effective measure of relative molecular weight of the polymer, the higher the specific viscosity the higher being the molecular weight.

In the formulation of the plastisol compositions for use in the invention, the fine particle size resin is uniformly dispersed in a mass of fluid plasticizer. The fluidity of plastisols is influenced in part by the particular resin and plasticizers selected, but is also a function of the ratio of plasticizer to resin. Plastisols become less fluid as the ratio of plasticizer to resin is reduced. Coating compositions for use in the invention preferably contain from about 20 to about 150 parts plasticizer per 100 parts resin with a range of about 50 to about 80 parts plasticizer per 100 parts resin being particularly effective. The viscosity of plastisol compositions can also be reduced by addition of small amounts of a volatile diluent not exceeding about 10 parts per 100 parts resin; it being required that the diluent have no solvating effect on the resin. Useful diluents include benzene, toluene, methyl ethyl ketone, petroleum solvents such as V.M. and P. naphtha (boiling range of 190°–275° F.) and the like.

Organosols for use in the invention preferably contain about 20 to about 55 parts of plasticizer per 100 parts of resin with about 30 to 40 parts of plasticizer per 100 parts of resin being particularly preferred, whereas plastisols usually contain about 45 to about 150 parts of plasticizer per 100 parts of resin. The amount of solvent utilized depends in large measure on the coating viscosity best suited for the coating apparatus utilized.

The selection of the plasticizer is important in determining the strength and flexibility of the coating and also in influencing the viscosity and viscosity stability of the composition and the foaming characteristics of the foamable composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di (2-ethylhexanoate), diethylene glycol diperlargonate, triethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to fuse the resin. A vapor pressure of 2 millimeters of mercury or less at 400° F. has been found particularly satisfactory.

Small amounts of stabilizers, well known in the art of making polyvinyl chloride compositions, are incorporated in the coating composition to minimize the effects of degradation by light and heat. Primary stabilizers ordinarily used are metallo-organic compounds, salts or complexes containing a metal component such as cadmium, zinc, lead, tin, barium or calcium combined with an anion constituent such as octaoate, 2-ethylhexoate, naphthenate, tallate, benzoate, oxide, acetate, stearate, phenate, laurate, caprylate, phosphite, phthalate, maleate, fumarate, carbonate, sulfate, silicate alkyl mercaptide, or mercaptoacid salts and esters. Mixtures containing one or more metals and/or one or more anion components are commonly employed. Depending upon the degree of heat and light stability required, secondary or auxiliary stabilizers such as epoxidized components, organic phosphites and phosphates, polyhydric alcohols, ultra violet light absorbers, optical brighteners, nitrogen compounds and antioxidants may also be incorporated in the resinous composition.

The coating compositions can contain pigments in accordance with the particular color desired. Any of the organic and inorganic pigments well known in the art for plastic compositions can be used. Normally, from about 0.5 to about 5 parts pigments per 100 parts resin are used.

The foamable compositions contain, in addition, an effective amount of blowing agent. The larger the amount of blowing agent within practical limits used, the greater is the expansion of the foam. Foam densities of from 12 to about 40 pounds per cubic foot can readily be obtained. Such results are attainable with from about 1 to about 20 parts blowing agent per 100 parts resin. About 2 to 10 parts blowing agent per 100 parts resin is particularly effective for the production of foams of a density which are most desirable for use in producing floor coverings in accordance with the invention.

Blowing agents are well known in the art and the particular blowing agent selected usually depends on such matters as cost, resin and density desired. While many compounds decompose by giving off a gas, only a relatively few are produced commercially in quantity. Complex organic compounds which, when heated, decompose to yield an inert gas and have residues which are compatible with the resin are preferred as blowing agents. Such materials have the property of decomposition over a narrow temperature range which is particularly desirable to obtain a good foam structure.

Typical types of blowing agent which can be mentioned include substituted nitroso compounds

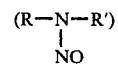

substituted hydrazides ($RSO_2NHNHR'$), substituted azo compounds ($R—N{=}N—R'$), acid azides ($R—CON_3$), guanyl compounds

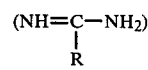

and the like wherein R and R' are hydrogen or hydrocarbon groups usually containing from one to ten carbon atoms.

The blowing agents which have found the most widespread uses are those compounds having the N—N or —N=N— linkages which decompose at elevated temperatures to yield an inert gas high in nitrogen. These compounds have the general formula

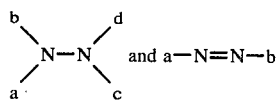

wherein a, b, c, and d are hydrocarbon groups preferably containing up to ten carbon atoms, or hydrogen with at least one of the groups being a hydrocarbon group. Many of these hydrocarbon groups contain additional nitrogen groups such as hydrazide, amido, nitro, nitrile and the like. The presence of such groups is also desirable since they can readily react with the inhibitor to form derivatives having different decomposition temperatures.

Typical blowing agents with their decomposition temperature ranges are shown in Table 1:

TABLE 1

| Blowing Agent | Decomposition Temperature °F. |
|---|---|
| Azodicarbonamide (NH$_3$CN=N—C—NH$_3$) with O, O double bonds | 325–400 |
| p,p'-oxybis(benzene sulfonyl hydrazide) | 300–340 |
| p,p'-oxybis (benzene sulfonyl semicarbazide) | 390–425 |
| Azobisisobutyronitrile | 215–250 |
| N,N'-dimethyl-N,N'-dinitrosoterephthalamide | 190–220 |
| Diazoaminobenzene | 212–266 |

Additional blowing agents which can be mentioned are N,N' dinitrosopentamethylenetetramine, aminoguanidine bicarbonate, p,p'-thiobis (benzene sulphonhydrazide) p,p'-diphenylmethane disulphonohydrazide, benzene sulphonhydrazide, terephthalazide, benzazide, p-tert.-butyl benzazide, phthalazide, isophthalazide, 1,3-diphenyltriazene, azohexahydrobenzonitrile, azo dicarboxylic acid diethyl ester, napthalene-1,5-disulfonyl hydrazide and biuret.

Blowing agents for use in the invention must be decomposed an effective amount at a temperature below the decomposition temperature of the resin used. The preferred blowing agents are those that decompose above the elastomeric point of the resin composition since this enables at least partial gelling of the foamable coating so that a design can readily be printed on its surface. Such blowing agent usually decomposes above 200° F. As an illustration, with the preferred vinyl chloride polymers, a blowing agent decomposing between about 300° F. and about 450° F. can be used. The minimum initial decomposition temperature must be sufficiently high to prevent premature gas evolution occurring during processing. In some instances, a combination of blowing agents can be used to advantage.

It is common to add accelerators or catalysts to the compositions to accelerate the decomposition of the blowing agents, reduce the decomposition temperature and/or narrow the decomposition range. Common accelerators are various metal salts such as dibasic lead phosphite, dibasic lead stearate, dibasic lead phthalate, dibasic lead acetate, basic lead acetate, lead stearate, lead acetate, lead oxide, tribasic lead maleate, tetrabasic lead naphthenate, lead fumarate, lead 2-ethyl hexoate, and similar lead salts, zinc laurate, zinc oxide, zinc stearate, zinc carbonate, zinc 2-ethyl hexoate, zinc di-n-octoate, zinc naphthenate, and similar zinc salts, cadmium octoate, cadmium oxide, cadmium acetate, cadmium naphthenate, cadmium stearate, barium stearate, calcium stearate, nickel stearate, aluminum stearate, magnesium stearate, tin stearate, dibutyl tin maleate, and dibutyl tin oxide. These agents can also serve as stabilizers for the composition. In the specification and claims the term "blowing agent" is intended to include not only the blowing agent or chemical itself, but also the combination of a blowing agent with an accelerator.

The foamable composition is formed into a film of the desired thickness and then heated to gel the composition to give a good printing surface. In this specification and claims, the term "gel" includes both the partial (atleast the elastomeric point) and complete solvation of the resin or resins with the plasticizer (fused). The heating is limited as to the time and temperature to prevent the decomposition of the blowing agent in the composition. When using the preferred polyvinyl chloride composition, the temperature of the composition is preferably raised to about 240° F. to about 275° F. Generally, the actual oven temperature would be a slightly higher temperature. If the foamable composition is to be formed into a self-supporting film, then the temperature would conventionally be high enough to fuse the composition.

The degree of foaming of a typical plastisol formulation using different concentrations of blowing agent is shown in the Table 2:

TABLE 2

| Parts Azodicarbonamide per 100 parts resin | Ratio of foam thickness to original thickness | Density (lbs. per cu. ft.) |
|---|---|---|
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

It has been found that density of from about 10 to 30 pounds per cubic foot produces the most useful products. Table 3 gives the preferred temperature and time relationship using the preferred polyvinyl chloride resin:

TABLE 3

| Film condition[1] | Resin temperature (oF.) | Oven temperature (oF.) circulating air | Exposure time (seconds) |
|---|---|---|---|
| Elastomeric point | 240–300 | 250–400 | 10–200 |
| Fused | 240–375 | 350–450 | 60–240 |
| Blown | 340–400 | 350–450 | 60–240 |

The time required to reach the elastomeric point will depend in part on the film thickness and particular base as shown in Table 4:

TABLE 4

| Base | Film thickness (inch) | Time/temperature (seconds/°F.) |
|---|---|---|
| A[1] | 0.008 | 45/300 |
| A[1] | 0.014 | 69/300 |
| B[2] | 0.014 | 90/300 |

[1] A cellulosic felt of 0.025 inch thickness impregnated with 25 percent vinyl acetate homopolymer.
[2] A cellulosic felt of 0.043 inch thickness containing 5 percent of a cured ureaformaldehyde resin and 25 percent of butadiene-acrylonitrile polymer.

[1] A cellulosic felt of 0.025 inch thickness impregnated with 25 percent vinyl acetate homopolymer.

[2] A cellulosic felt of 0.043 inch thickness containing 5 percent of a cured ureaformaldehyde resin and 25 percent of butadiene-acrylonitrile polymer.

While the foamable composition is described as being applied as a coating to the base, it is apparent that this composition can also be applied as a preformed sheet or the composition can be molded, extruded, calendered or otherwise formed into any desired shape depending on the ultimate use of the product.

A design is printed on the gelled surface of the foamable composition using any of the conventional printing techniques such as silk screen, offset or direct rotogravure printing. If desired, an inhibitor can be added to one or more of the inks. Such inks usually contain a carrier for the pigment, such as a vinyl resin, and, in some cases, a plasticizer for the resin to give good adhesion to the printing surface.

The sheet from which the flakes are made can be composed of any of the resins mentioned in the discussion of the foamable composition. Again, polymers of vinyl chloride are the preferred resins for use in the invention, but the particular resin chosen to form the flakes should be compatable with the resin used to form the foamable composition. The thickness of the sheet can vary, with thicknesses from about 0.010 to about 0.015 being preferable, and the sheet can either be transparent or pigmented to some desired color. This sheet also contains from about 2 percent to about 5 percent of inhibitor. The inhibitor for the blowing agent is an agent which significantly alters the decomposition temperature of the blowing agent in the area of the foamable composition below where it is deposited. By varying the concentration of the inhibitor, the degree of suppression or acceleration of the decomposition of the blowing agent can be controlled to produce foam layers of various heights or thicknesses.

The chemical composition of the blowing agents varies widely and, therefore, the type of compound utilized as an inhibitor will vary. Compounds which have been found to be effective as inhibitors to alter the decomposition temperatures for blowing agents which contain the —N=N— or N—N linkages are the following groups:

(1) Organic acids, and particularly such as maleic, fumaric, adipic, malic, citric, salicylic, trimellitic, pyromellitic, malonic, 1,2-phthalic, anthranilic, oxalic, formic, furoic, benzoic, 2,6-dihydroxybenzoic, sorbic, levulinic, stearic, myristic, trimesic, oleic, octanoic, o-nitrobenzoic, isosebacic and glutaric, trans-1, 2-diaminocyclohexane tetraacetic acid monohydrate, 4-methoxybenzoic, dihydroxytartaric, o-aminobenzoic, m-aminobenzoic, p-aminobenzoic, 1-naphthoic, terephthalic, dl-mandelic, azelaic, nitrilotriacetic, trichloroacetic, barbiturie, 2-pyridinecarboxylic, 2,3-pyridinedicarboxylic, ascorbic acid, and abietic acid. As a general rule, the most useful acids are those having at least two carboxyl group and one hydroxy group and which contain from 2 to 12 carbon atoms.

(2) Organic acid halides preferably contain from 2 to 20 carbon atoms and particularly the chlorides such as trimellitic anhydride monoacic chloride, stearoyl chloride, phthaloyl chloride, benzoyl chloride, palmitoyl chloride, cinnamoyl chloride, fumaryl chloride, 1-naphthoyl chloride, terephthaloyl chloride, p-nitrobenzoyl chloride, 4-methoxybenzoyl chloride, isophthaloyl chloride, terephthaloyl chloride, trichloroacetyl chloride, bromoacetyl bromide, chloroacetyl chloride, phenylacetyl chloride, acetyl bromide, n-butyoyl chloride, propionyl chloride, iso-valeryl chloride, n-valeryl chloride, 2-bromopropionyl bromide, dichloroacetyl chloride, oxalyl chloride, lattroyl chloride, myristol chloride, palmitoyl chloride, succinyl chloride, hexanoyl chloride, hydrocinnamoyl chloride, adipyl chloride, isobutyryl chloride, 4-methyl-n-valeryl chloride, crotonyl chloride, 2-chloropropionyl chloride, 2-phenoxypropionyl chloride, phenoxyacetyl chloride, propionyl bromide, isobutyryl bromide, n-valeryl bromide, 2-bromo-2-methylpropionyl bromide, sebacyl chloride, cyclohexanecarbonyl chloride, ethyl oxalyl chloride, 10-undecenoyl chloride, undecanoyl chloride, benzoyl bromide, m-bromobenzoyl bromide, o-chlorobenzoyl chloride, anisoyl chloride, 2-furoyl chloride, 2-naphthoyl chloride, m-bromobenzoyl chloride, 2,4-dichlorobenzoyl chloride, p-phenylazobenzoyl chloride, and 1-intro-2-anthraquinonecarboxyl chloride.

(3) Organic acid anhydrides preferably those containing from 2 to 20 carbon atoms such as maleic, phthalic, succinic, pyromellitic dianhydride, citraconic, pyrotartaric, dodecenyl succinic, trimellitic, tetrahydrophthalic, tetrachlorophthalic, hexahydrophthalic, endocis-bicyclo [2.2.1] hept-5-end-2,3-dicarboxylic anhydride, 3,3',4,4'-benzophenone tetracarboxyl dianhydride, 1,2:3,4-cyclopentanetetracarboxylic acid dianhydride, chlorendic anhydride, dichloromaleic anhydride, acetic anhydride, benzoic anhydride, chloroacetic anhydride, propionic anhydride, n-butyric anhydride, iso-butyric anhydride, n-valeric anhydride, hexanoic anhydride, n-heptanoic anhydride, citraconic anhydride, bicyclo (2,2,1) 5-heptone-2,3-dicarboxylic anhydride, cis-4-cyclohexene-1,2-dicarboxylic anhydride, 7-oxabicyclo (2,2,1) heptane-2,3-dicarboxylic anhydride, maleopimaric acid anhydride, trifluoroacetic anhydride, pyrotartaric anhydride, glutaric anhydride, dichloroacetic anhydride, itaconic anhydride, 4-methyl-2-cyclohexane-1,2-dicarboxylic anhydride, tetrabromophthalic anhydride-3-nitrophthalic anhydride, tetraiodophthalic anhydride, naphthalic anhydride, 5-norborene-2,3-dicarboxylic anhydride, 3-chlorophthalic anhydride, 4-chlorophthalic anhydride, 4-methylphthalic anhydride, pyromellitic dianhydride.

(4) Polyhydroxy alcohols. The polyhydroxyl aromatic compounds, which form a useful sub-class of alcohols, preferably contain two functional groups, and from 2 to 20 carbon atoms. Representative compounds include p-aminophenol, catechol, resorcinol, hydroquinone, pyrogallol, phloroglucinol, 4-tert-butyl-pyrocatechol, 2,5-ditertiary-butyl hydroquinone, p-benzoquinone, 1,8-dihydroxyanthraquinone, 2,3-naphthalenediol, 1,3-naphthalenediol, 1,5-naphthalenediol, monotertiary-butyl hydroquinone, alizarin, purpurin, morin, o-hydroxybenzyl alcohol,α-nitroso-β-naphthol, and p-nitrobenzene-azo-α-naphthol. Aliphatic alcohols which can be used preferably contain at least two hydroxy groups and include mannitol, sorbitol, glycerol, ethylene glycol and diethylene glycol.

(5) Carboyhydrates, such as d-maltose, d-galactose, d-glucose and fructose.

(6) Nitrogen containing compounds such as amines, amides, oximes, and the like, such as ethanolamine, cyclohexylamine, benzylamine, piperazine, p-nitroaniline, acetoacetanilide, N,N'-disalicyclidene-1,2-propane diamine, ethylenediamine, triethylenediamine, N,N-diethylaniline,α-benzoin oxime, dimethyl glyoxime,α-furil dioxime, diphenyl carbazone, saliclaldoxime, guanidine carbonate, triethylene tetramine, N-chlorosuccinimide, piperazine, 3,3'-iminobispropylamine, p-phenylene diamine, nicotine, quinine, quinidine, 8-hydroxyquinoline, piperazine, 1,3-dichloro-5,5-dimethylhydrantoin, imidazole, 1,10-phenanthroline monohydrate, p-nitrobenzene-azo-α-naphthol, 1-(2-pyridyl-azo)-2-naphthol, phthalic hydrazide, hydrazobenzene, p-toluene sulfonhydrazide and maleic acid hydrazide, Hexadecyltrimethyl ammonium stearate, hexadecylpyridinium chloride, 1-ethyl quinaldinium iodide. The amine is preferably a primary or secondary aliphatic mono- or polyamine. The aliphatic portion may contain an aromatic or cyclic grouping and be saturated or unsaturated. Cyclic compounds can, for example, have a 6 to 10 member ring and can have from 3 to 12 carbon atoms. Certain of the tertiary aliphatic amines also are useful amines.

(7) Sulphur containing compounds such as thiols or mercaptans, sulfides, sulfones, sulfoxides, sulfonic acids, sulfonyl chloride, sulfonamides, sulfimides and the like, as for example: 2-mercaptobanzothiazole, α,α'-dimercapto-p-xylene, mercaptosuccinic acid, 1-dodecanethiol, methanethiol lead salt, trimethylolpropane tris (3-mercaptopropionate), benzothiazyl disulfide, tetraethylthiuram disulfide, butadiene sulfone, glycol dimercaptoacetate,α-monothioglycerol, tetramethyl thiuram monosulfide, carboxy methylmercaptosuccinic acid, thiodiglycolic acid, tetramethyl thiuram disulfide, ethylene thiourea, diphenylthiocarbazone, 1-cysteine, o-benzoic sulfimide, sym-diphenyl-thiourea,α-naphthalene sulfonic acid, 4,4'-biphenyldisulfonic acid, 2-naphthalenesulfonic acid, m-benzenedifulfonic acid, thioacetamide, p-toluenesulfondichloroamide, 1-ethyl-2-phenyl-2-thiourea, 1,3-diethyl-2-thiourea, 1-phenyl-2-thiourea, 1,1,3,3-tetramethyl-2-thiourea, 2,5-dihydrothiophene-1,1-dioxide, p-toluenesulfonyl chloride, 2-naphthalenesulfonyl chloride, glyoxal sodium bisulfide, sodium dithionite, benzenethiol, 1-butanethiol, p-toluenethiol, 2-naphthalenethiol, ethanethiol, alphatoluenethiol (benzyl mercaptan), 3-methyl-butanethiol, 1-propanethiol, methanethiol, 2-propanethiol, 1-heptanethiol, 2-methylpropanethiol, mercapto-acetic acid (thioglycolic acid), 1-pentanethiol, glutathione, o-toluenethiol, m-toluenethiol, 1,2-ethanedithiol, o-mercaptobenzoic acid, 2-methyl-2-propanethiol, 2-mercapto-6-nitrobenzothiazole, 6-amino-2-mercaptobenzothiazole, 2-mercaptoethanol, ethyl mercaptoacetate, o-aminobenzenethiol, toluene-3,4-dithiol, 1-hexanethiol, 5-amino-2-benzimidazolethiol, 2-benzoxazolethiol, 3-mercaptopropionic acid, 1-dodecanethiol, 2-mercapto-acetanilide, 2-ethyl-1-hexanethiol, p-chlorobenzenethiol, methyl, mercaptoacetate, 2,3-quinoxalinedithio, 2-furanmethanethiol, 2-phenylethanethiol, p-tert-butyl-benzenethiol, 1-octanethiol, 2-(phenylthio) quinoline, ethyl 2-mercaptoethyl carbonate, 4-mercaptobutyric acid, 2,3-dimercaptopropanol, 2,3-dihydroxy-1,4-dithioulbutane, isooctyl 3-mercaptopropionate, isooctyl thioglycolate, 1-thioglycerol, thiomalic acid, methoxymethyl thioglycolate, phenylmercaptoacetic acid, 2,9-para-menthanedithiol,β-mercaptoethyl-3-mercaptocyclohexane,β-mercaptoethyl-4-mercaptocyclohexane, 3-chloropropanethiol-1, pinanyl mercaptan, dithiolterephthalic acid, lauryl thioglycolate, stearyl thioglycolate, lauryl β-mercaptopropionate, stearyl β-mercaptopropionate, hydroxyethyl thioglycolate, hydroxyethylβ-mercaptopropionate, ethylene bis-mercaptoacetate, ethylene bis-β-mercaptopropionate, trimethylolethane, tri-mercaptoacetate, trimethylolpropane tris-mercaptoacetate, pentaerythritol tetrakismercaptoacetate, pentaerythritol, tetrakis-β-mercaptopropionate, 31 organotin sulfur, dibutyl tin mercaptopropionate, dibutyl tin bis-(lauryl-mercaptide), alkyl tin mercaptide, and benzyl thiouronium chloride.

(8) Isocyanates such as 2,4-tolyene diisocyanate, p.p'-diphenylmethane diisocyanate, bitolyene diisocyanate, methylene bis (4-phenylisocyanate), dianisidine diisocyanate, phenyl isocyanate, 1-naphthyl isocyanate, p-tolyl isocyanate, p-nitrophenyl isocyanate, 2-naphthyl isocyanate, m-tolyl isocyanate o-tolyl isocyanate, p-ethoxyphenyl isocyanate, p-bromophenyl isocyanate, o-chlorophenyl isocyanate, m-chlorophenyl isocyanate, p-chlorophenyl isocyanate, 2,5-dichlorophenyl isocyanate, o-ethoxyohenyl isocyanate, o-nitrophenyl isocyanate, 2-biphenylyl isocyanate, m-nitrophenylisocyanate, 4-biphenylylisocyanate, o-methoxyphenyl isocyanate, p-methoxyphenyl isocyanate, p-methoxyphenyl isocyanate, tolylene-2, 4-diisocyanate, m-xylylene diisocyanate, p-xylylene diisocyanate, methylenedi-p-phenyl diisocyanate and p-phenylazophenyl isocyanate.

(9) Ketones and aldehydes such as cyclohexanone, acetylacetone, 1,3-diphenyl-1,3-propanedione, 1-phenyl-1, 3-butanedione, glyoxal, preferred compounds within this class will contain two functional groups, i.e., polyketones or polyaldehydes.

(10) Phosphate and phosphite compounds such as n-butyl acid phosphate, diamyl amyl phosphonate, trilauryl trithiophosphite, and phenylneopentyl phosphite.

(11) Other interesting compounds which exert inhibiting qualities are 6,6-dimethyl fulvene, hexachlorocyclopentadiene, 2,4-dinitrophenol, n-hexyl chloroformate, p-nitrobenzyl chloroformate, dibutyl tin maleate and positive chlorine compounds such as dichloroisocyanuric acid, trichloroisocyanuric acid, potassium dichloroisocyanurate, N-chloro-p-benzoquinone imine, dichloroamine, and halene. Some of these latter compounds are contained in the above groups.

When blowing agents are utilized having a reducible bond such as an azo group, a reducing agent is a particularly effective inhibitor. Typical reducing agents are hydroquinone, polyhydroxyaromatic compounds, phenylenediamines, hydrazobenzenes, alkali metal dithonite, mercaptans such as α,α'-dimercapto-p-xylene and mercaptosuccinic acid, and the reducing sugars.

The inhibitors will not be useful for all types of blowing agents. Aminoguanidine bicarbonate is best inhibited with anhydrides such as maleic and trimellitic; N,N'-dimethyl-N,N'-dinitrosoterephthalamide is inhibited by similar anhydrides and chlorides such as terephthaloyl chloride; p,p-oxybis (benzene sulfonyl hydrazide) is inhibited particularly effectively by trimellitic anhydride, terephthaloyl chloride, fumaric acid and hydroquinone. Diazoaminobenzene is inhibited by maleic and trimellitic anhydride and p,p'-oxybis (benzene sulfonyl semicarbazide) is inhibited with maleic and trimellitic anhydride, fumaric acid and terephthaloyl chloride. It is interesting to note that inhibitors such as these catalyze the decomposition of N,N'-dinitrosopentamethylene tetramine resulting in raised areas when these inhibitors are applied. Care must be exercised in selecting the inhibitor to produce the desired results.

The inhibitor produces a differential in the amount of expansion of the contacted areas as compared to the other areas when the heating of the composition is controlled to permit the differential expansion. This results from a lowering or raising of the decomposition temperature of the contacted blowing agent. The portions of the resinous composition layer on which the inhibitor containing flakes rest will be higher or lower, because of this differential decomposition of the blowing agent. The chemical mechanism involved is not known, but it is believed the inhibitor reacts with the functional group or groups on the blowing agent to form a compound or complex having a decomposition temperature different from the blowing agent itself. The acid and acid anhydride are believed to function in this manner. In the use of a reducing agent, the azo group is reduced with hydrogen or a hydrocarbon radical. The inhibitor could also be interfering with the action of the accelerator. It is believed that the metal accelerator will cause the hydrolysis of the amide group in such blowing agent as azobisformamide to form the corresponding salt. The inhibitor may slow down or strop this hydrolysis. Alternately, the inhibitor can function as a catalyst or activator in changing the decomposition temperature of the blowing agent.

In accordance with the invention, the inhibitor-containing sheet is granulated to form flakes of a desired size; most preferably, the largest diameter is about 3/32" to about 1/64". The flakes are distributed over the printed surface of the gelled foamable composition by some suitable process. One useful method is the wet flocking technique, whereby a thin layer of plastisol is applied to the surface of the foamable composition and the flakes are scattered onto the plastisol. The plastisol used in this manner serves as an adhesive in securing the flakes to the surface of the foamable composition.

If this method of distributing the flakes is used, it is desirable to apply an overall clear resinous wear layer to the surface of the product. Such a wear layer can be preformed, self-supporting, non-fused, translucent sheet of resinous composition having a thickness of from about 0.014 inch to about 0.050 inch. This type of wear layer is applied to the product prior to the final heating so that during the final heating both the wear layer and the foamable composition are fused and bonded and the wear layer conforms to the surface embossings of the blown foamable composition. Alternately, a layer of clear plastisol can be applied to the unfused surface of the product, so that when the product is fused, the resin in the plastisol becomes completely solvated with plasticizer to form a solid, durable layer that conforms to the surface embossings of the fused product.

An alternate method of distributing the inhibitor containing flakes is to incorporate the flakes into a preformed wear layer such as the one previously mentioned. In U.S. Pat. No. 3,660,187, Shortway et al discloses a wear layer that is produced by preparing chips of resinous composition, mixing the chips with a plastisol and then calendering the mixture into a sheet without fusing the plastisol. The sheet is then laminated to the surface of the printed foamable composition prior to the final heating. This procedure can be used with the invention by substituting the inhibitor-containing flakes for some or all of the resinous chips. The inhibitor-containing flakes are mixed with the clear plastisol, and when the mixture is sheeted the flakes are randomly dispersed throughout the sheet, which is then laminated to the printed, unfused foamable composition. During the final heating, the flakes act as an inhibitor preventing the blowing agent from decomposing in the areas underneath the flakes. Regardless of the method used to distribute the flakes over the surface of the foamable composition, the quantity of flakes used should not be sufficient to cover more than 20 percent of the surface area of the foamable composition for good results.

The entire assembly comprising the foamable resinous composition, the inhibitor containing flakes and the wear layer is then heated to a temperature sufficient to fuse the resinous compositions and decompose the blowing system. The temperature of the entire mass of composition upon the backing must attain the fusion temperature of the resin in order to obtain a product of maximum strength and stain resistance. Using the preferred vinyl resin, fusion is attained at a temperature of about 325° F. to about 375° F. In addition, the entire mass of foamable composition must be heated to a point where the blowing agent is decomposed. When the preferred high temperature blowing agent is used, foaming does not occur until the resinous composition has been fused. The heating must be carried out, however, at a temperature which allows decomposition of the blowing agent only in the areas desired.

If volatile components are used in the compositions, care must be taken that they are essentially completely removed from the film prior to fusion. This can be accomplished by heating the composition at a temperature substantially below the fusion temperature and minimum decomposition temperature of the blowing agent for sufficient time to remove the volatile material. For example, if a hydrocarbon solvent fraction (boiling point up to 350° F.) is used, heating at 200° F. -250° F. for 5 minutes will remove sufficient material so that fusion and blowing at 400° F. can be accomplished with good cell structure and freedom from blisters. Heating in order to effect fusion and foaming can be brought about in a forced hot air oven; however, other types of heating can be used. For example, the product can be passed beneath radiant heating elements; alternately, dielectric heating can be used.

After being cooled, the product is withdrawn from the processing apparatus. It can be used in the form of a sheet as produced or can be cut into tiles or other appropriate shapes depending on the particular use to which the product is to be put. Products produced in accordance with the invention have the characteristics of excellent resilience, depending in part on the thickness of the foam layer. They are also characterized by having true random embossings and a geometric design. These products can also have a random design in perfect register with the random embossings, if desired, or they can have a combination of random and geometric embossings in register with the design.

The following examples will further illustrate the embodiments of this invention. In these examples, all parts given are by weight unless otherwise noted.

EXAMPLE 1

This illustrates the preparation of a wear resistant, embossed, resinous composition typical of the products of this invention. Preparation of Foamable Resinous Composition:

A 0.035 inch thick asbestos sheet backing was coated, in a wet thickness of 0.015 inch, with the following foamable plastisol:

|  | Parts |
|---|---|
| Polyvinyl chloride (low molecular weight) | 50 |
| Polyvinyl chloride (high molecular weight) | 50 |
| Dibasic lead phosphate | 1.5 |
| Azodicarbonamide | 2.5 |

-continued

| | Parts |
|---|---|
| Titanium dioxide | 5 |
| Butyl benzoyl phthalate | 55 |
| Dodecyl benzene | 10 |

Gelling of the foamable plastisol was accomplished by heating the coating for a period of 2½ minutes in a 400° F. oven.

Thereafter, the following ink was applied to sections of the gelled plastisol by means of a rotogravure printing technique:

| | Parts |
|---|---|
| Vinyl chloride-vinyl acetate copolymer | 7.5 |
| Methyl ethyl ketone | 47.5 |
| Titanium dioxide | 14.0 |

The transparent flakes which were used in this sample were prepared from the following formulation:

| | Parts |
|---|---|
| Polyvinyl chloride | 100 |
| Dioctyl phthalate (plasticizer) | 32.5 |
| Benzottiazole (inhibitor) | 7.2 |
| Butyl benzoyl phthalate | 4.5 |
| Stabilizer | 7.5 |
| U. V. light absorbent | .4 |

The flake stock was formed into a transparent, 0.010 inch thick sheet which was then comminuted into flakes of approximately 3/32 inch in maximum dimension. The flakes were randomly spread over the printed, gelled surface of the foamable composition by means of the wet flocking process.

The plastisol for the wear layer was formulated by thoroughly mixing the ingredients listed below:

| | Parts |
|---|---|
| Dioctyl phthalate | 99 |
| Butyl benzoyl phthalate | 16 |
| Stabilizer | 19.2 |
| Polyvinyl chloride and dioctyl phthalate plastisol | 48 |
| Dispersion grade polyvinyl chloride | 320 |

The surface of the sample was coated with the above plastisol in a wet thickness of 0.025 inch. The sample was heated in an oven at 380° F. for 3 minutes. During the heating operation, the foamable composition and the plastisol layer became fused and the blowing agent decomposed to form elevated cellular sections of the surface of the product. Those areas under the inhibitor containing flakes remained essentially non-cellular, and so were not elevated appreciably, and thus a product with random embossing was produced.

EXAMPLE II

The procedure of Example I was followed with the exception that 10 parts fumaric acid, as an inhibitor, was added to the printing ink. This resulted in additional depressions on the surface of the final product in the areas of the ink application, and so embossings in register with the geometric design were produced in addition to the random embossings produced by the inhibitor-containing flakes.

EXAMPLE III

The procedure of example II was followed with the exception that 3 parts of the pigment titanium dioxide was added to the vinyl resin used in the formation of the sheet from which the flakes were formed. Thus, in addition to the geometric design and corresponding registered embossing, the pigmented inhibitor-containing flakes create a random design in register with the random embossing caused by the flakes.

EXAMPLE IV

The procedure of example 1 was followed with the following exceptions: Instead of distributing the flakes over the gel surface of the foamable composition by means of the wet flocking process, the inhibitor-containing flakes were mixed with the plastisol that had been used in Example 1 for the wear layer. This mixture was calendered to form a sheet of approximately 0.020 inch in thickness, and the sheet was then laminated to a gelled, printed, foamable sheet identical to that which was used in Example 1. The sample was fused and blown in an oven at 385° F. for 3 minutes. The appearance of this sample was similar to the sample in Example 1.

We claim:

1. In a process for producing a wear resistant, multilayered resinous assembly on a base, said process comprising the steps of: forming into a layer a foamable resinous polymer composition containing a blowing agent; heating to gel said layer; printing a design on said layer with ink; applying a wear layer thereto, and; heating the resulting assembly to the decomposition temperature of said blowing agent; the improvement which comprises randomly distributing flakes of a resinous composition containing an inhibitor for said blowing agent onto the printed surface of the gelled foamable resinous polymer composition, applying a clear wear layer thereto, and heating the resulting assembly to effect the inhibition reaction and, thereafter, to decompose the blowing agent and fuse the resinous compositions so as to effect expansion at the sites of decomposition.

2. The process of claim 1 wherein said ink contains an inhibitor for said blowing agent.

3. The process of claim 1 wherein said flakes are composed of a polymer of vinyl chloride.

4. The process of claim 1 wherein said flakes are transparent.

5. The process of claim 1 wherein said flakes are pigmented.

6. The process of claim 1 wherein said foamable resinous polymer composition includes a polymer of vinyl chloride.

7. The process of claim 1 wherein said blowing agent is selected from the group consisting of substituted nitroso compounds, substituted hydrazides, substituted azo compounds, acid azides and guanyl compounds.

8. The process of claim 1 wherein said inhibitor is selected from the group consisting of organic acids, organic acid anhydrides, organic acid halides, polyhydroxy alcohols, amines, amides, oxines, mercaptans, sulfides, sulfones, sulfoxides, sulfonic acids, sulfonyl halides, sulfonamides, sulfimides and isocyanates.

9. In a process for producing a wear resistant, multilayered assembly on a base, said process comprising the steps of: forming into a layer a foamable resinous polymer composition containing a blowing agent; applying an ink to portions of said layer; applying as a wear layer a preformed, non-fused, translucent sheet with thermoplastic decorative chips encompassed therein, and; heating the resulting assembly to the decomposition temperature of said blowing agent; the improvement which comprises replacing said thermoplastic decorative chips with flakes of a resinous composition containing an inhibitor for said blowing agent so as to prevent expansion of said foamable resinous polymer composition in the areas underneath said flakes.

10. The process of claim 9 wherein said ink contains an inhibitor for said blowing agent.

11. The process of claim 9 wherein said flakes are composed of a polymer of vinyl chloride.

12. The process of claim 9 wherein said flakes are transparent.

13. The process of claim 9 wherein said flakes are pigmented.

14. The process of claim 9 wherein said foamable resinous polymer composition includes a polymer of vinyl chloride.

15. The process of claim 9 wherein said blowing agent is selected from the group consisting of substituted nitroso compounds, substituted hydrazides, substituted azo compounds, acid azides and guanyl compounds.

16. The process of claim 9 wherein said inhibitor is selected from the group consisting of organic acids, organic acid anhydrides, organic acid halides, polyhydroxy alcohols, amines, amides, oxines, mercaptans, sulfides, sulfones, sulfoxides, sulfonic acids, sulfonyl halides, sulfonamides, sulfimides and isocyanates.

* * * * *